(12) United States Patent
Zirkind et al.

(10) Patent No.: US 8,326,461 B1
(45) Date of Patent: Dec. 4, 2012

(54) AUXILIARY COMMUNICATION SYSTEM FOR RADIO CONTROLLED ROBOTS

(75) Inventors: Naomi Zirkind, Morristown, NJ (US); Joshua Lee, Pine Brook, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1090 days.

(21) Appl. No.: 12/249,013

(22) Filed: Oct. 10, 2008

Related U.S. Application Data

(60) Provisional application No. 61/073,787, filed on Jun. 19, 2008.

(51) Int. Cl.
*G05B 19/00* (2006.01)

(52) U.S. Cl. ......... 700/264; 700/245; 700/250; 700/257

(58) Field of Classification Search .................. 700/245, 700/250, 257, 264
See application file for complete search history.

(56) References Cited

U.S. PATENT DOCUMENTS

| 5,350,033 | A | * | 9/1994 | Kraft .............................. 180/167 |
| 5,598,162 | A | * | 1/1997 | Terashima et al. ............ 341/176 |
| 6,031,454 | A | * | 2/2000 | Lovejoy et al. .......... 340/539.29 |
| 6,069,672 | A | * | 5/2000 | Claassen ........................ 348/734 |
| 6,703,962 | B1 | * | 3/2004 | Marics et al. ................. 341/176 |
| 7,011,171 | B1 | * | 3/2006 | Poulter .......................... 180/8.2 |
| 7,144,057 | B1 | * | 12/2006 | Young et al. ................. 296/24.3 |
| 2004/0019406 | A1 | * | 1/2004 | Wang et al. .................... 700/231 |
| 2006/0095158 | A1 | * | 5/2006 | Lee et al. ...................... 700/245 |

* cited by examiner

*Primary Examiner* — Khoi Tran
*Assistant Examiner* — Stephen Holwerda
(74) *Attorney, Agent, or Firm* — Michael C. Sachs

(57) ABSTRACT

A system for providing autonomous capabilities to a radio-controlled robot, comprises two communication boxes, one connected to the robot and the other connected to an operator control unit (OCU). Each communication box comprises two radios that are interoperable with preexisting data radios in the robot; a microprocessor unit; and bidirectional attenuators. The system further comprises a software application that runs on the microprocessor unit of each communications box, to integrate data into existing transmission data stream between the robot and OCU, via preexisting data radios. The system enables the issuance of additional commands besides those issued by the OCU, using the original OCU.

10 Claims, 8 Drawing Sheets

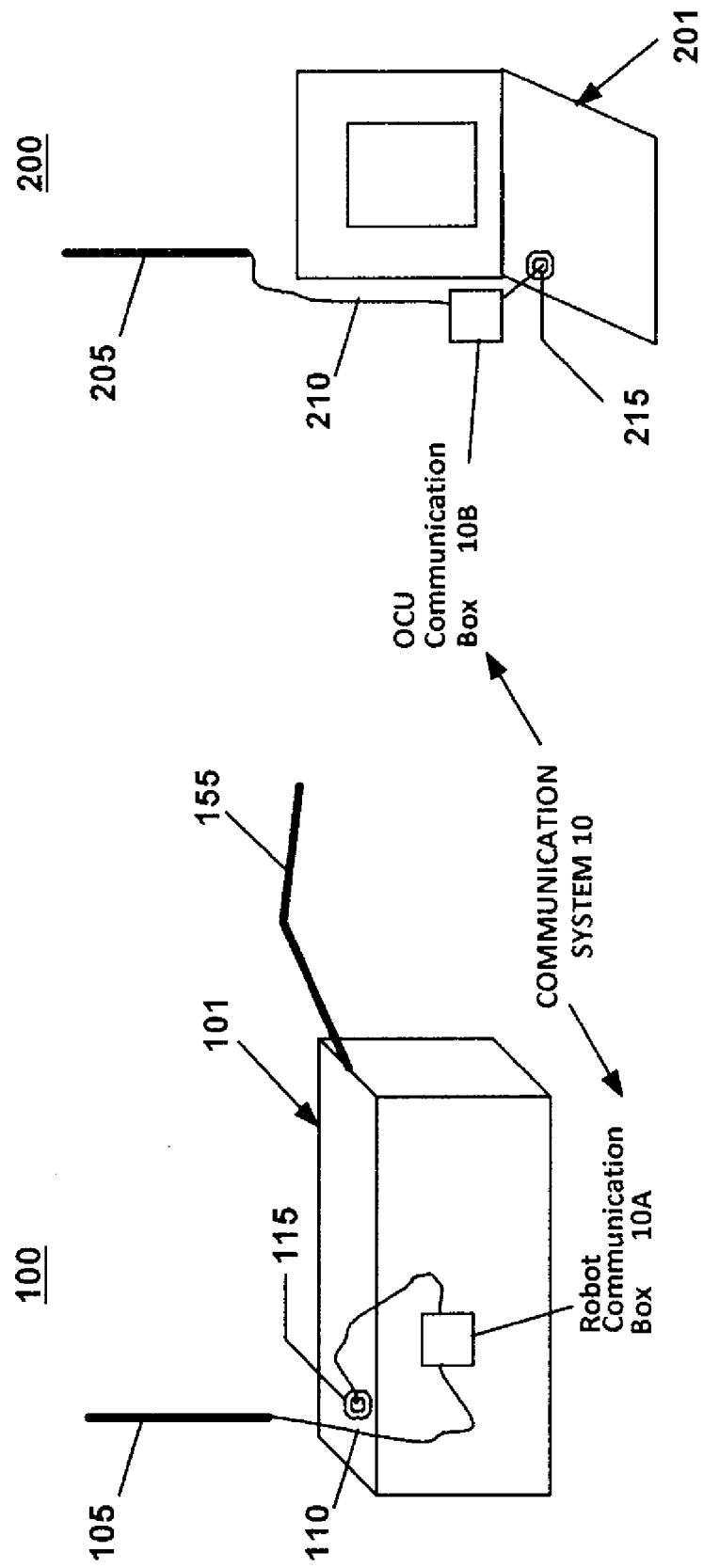

AUXILIARY COMMUNICATION SYSTEM FOR RADIO CONTROLLED ROBOTS

U.S. GOVERNMENTAL INTEREST

The inventions described herein may be manufactured, used and licensed by or for the U.S. Government for U.S. Government purposes.

FIELD OF THE INVENTION

The present invention generally relates to the field of tele-communications, and in particular to a system for providing autonomous capabilities to a radio controlled tele-operated robot.

BACKGROUND OF THE INVENTION

Conventional types of remote controllable robots are linked with operator control units (OCUs). An OCU is programmed to perform only certain applications, and to transmit data associated therewith. In the event additional functionality is desired, a robotic applications developer who wants to add commands or sensor data to the data stream has two main options.

According to a first option, the additional information is piggy-backed on the existing data stream. For example, the developer could insert his/her data in the slot reserved for the GPS signal. However, this approach has two significant drawbacks: (1) It removes some functionality from the robot, e.g., the capability of sending GPS information; and (2) the user is very limited in the data rate and data format of the data he/she sends, since it must conform to the format that the robot is expecting for that slot in the data stream.

According to a second option, the data is sent over a medium other than the radio signal. For example, a module could be placed on the robot to give it autonomous capabilities, and the commands sent from this module to the robot's drive, arm, and gripper motors could be sent to the robot via the robot's fiber optic or wire tether port. However, the robot will, in general, not be able to communicate concurrently via two different media, such as radio and wire tether. Therefore, while the autonomy module is operating, the robot operator cannot communicate with the robot via the radio link. In order to restore radio communication capability, the operator would have to turn off the autonomy module and re-establish the radio communication link. Thus, this type of data integration also removes significant functionality from the robot, i.e., it disables radio communication.

What is therefore needed is a communication system capable of transmitting data to a robot without removing functionality from the robot. The communication system should be operable to insert additional data into a preexisting data stream, without excessively slowing the overall data rate of the OCU-robot communication link. The communication system should also be capable of transmitting the data in a user-selectable data format. The need for such a system has heretofore remained unsatisfied.

SUMMARY OF THE INVENTION

The present invention satisfies this need, and presents a communication system for providing autonomous capabilities to a radio-controlled robot that is capable of performing desired functions, while effecting little or no impact on the preexisting data transmission system of the robot.

According to a first embodiment of the present invention, the present system comprises two communication boxes. A first communication box is connected to the robot and a second communication box is connected to an operator control unit (OCU).

Each communication box comprises two radios that are interoperable with preexisting data radios in the robot; a microprocessor unit; and bidirectional attenuators. The present communication system further comprises a software application that is executed on the microprocessor unit of each communications box, to integrate data into existing transmission data stream between the robot and OCU, via preexisting data radios.

The system enables the issuance of additional commands besides those issued by the OCU, using the original OCU. For example, payloads mounted on the robot can be controlled via an extraneous command interface on the OCU. Autonomous processes carried out by the robot can further be initiated via this command interface. Furthermore, data from sensors disposed on the robot can be received by an interface on the original OCU.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIGS. 1 and 2 are schematic drawings illustrating a communication system of the present invention, wherein the system comprises a robot communication box that is connected to a robot (FIG. 1), and an operator control unit (OCU) communication box that is connected to the OCU (FIG. 2);

DETAILED DESCRIPTION OF PREFERRED EMBODIMENTS

Figure 3:
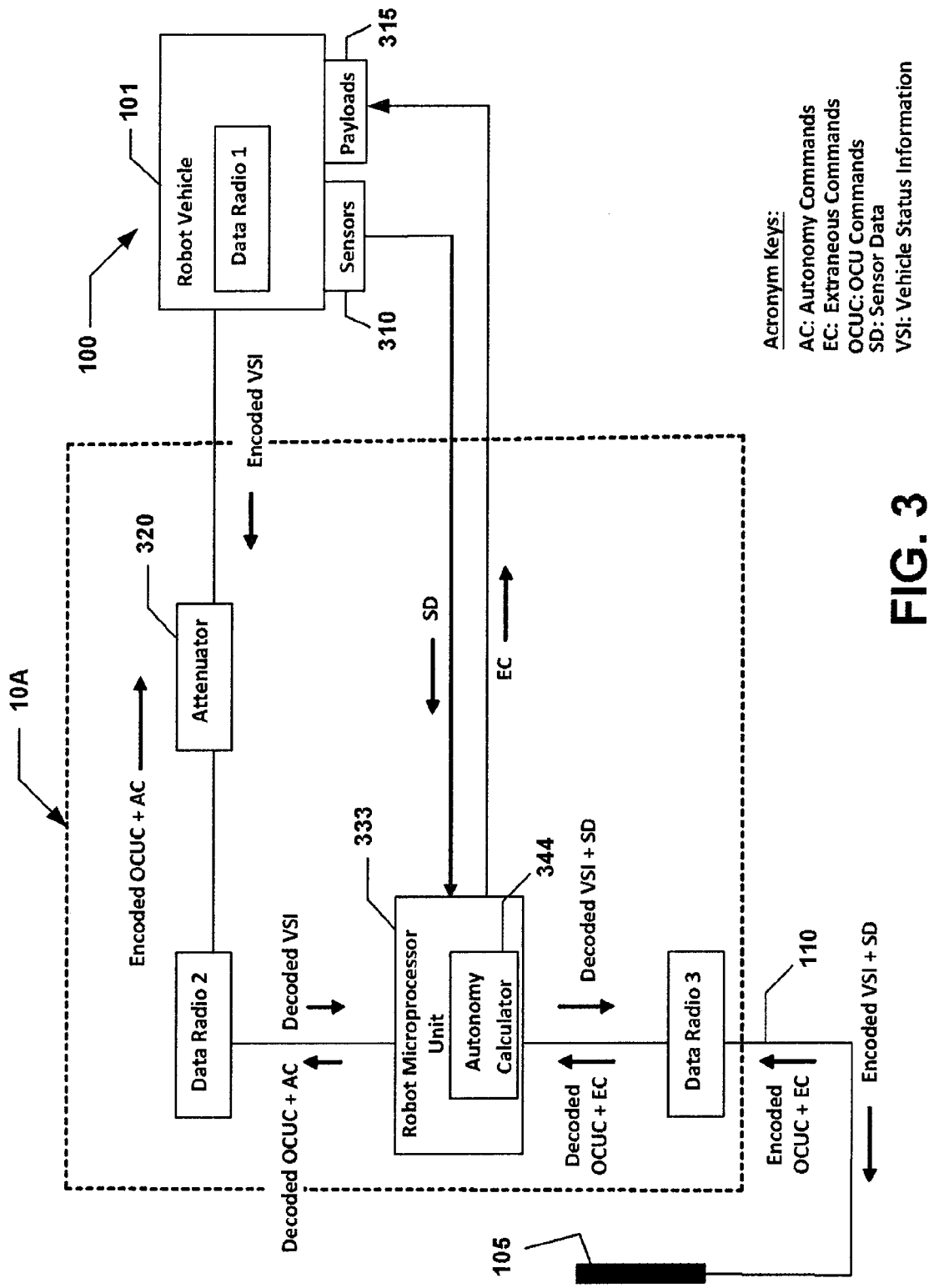
FIG. 3 is a block diagram detailing the main components of the robot communication box of FIG. 1, and including a robot microprocessor unit.

FIGS. 1 and 2 illustrate a communication system 10 of the present invention, wherein the system 10 comprises a robot communication box 10A (FIG. 1) that is connected to a robot 100, and an operator control unit (OCU) communication box 10B (FIG. 2) that is disposed in communication with an OCU 200.

In the present exemplary embodiment of FIG. 1, the robot 100 is illustrated to include a chassis 101 to which the robot communication box 10A is secured. The chassis 101 is a simplified representation of the electronic, electrical, optical, and mechanical components of an existing robot 100. The robot 100 further includes a data antenna 105, which is disposed in communication with the robot chassis 101 by means of a data antenna cable 110 and the robot communication box 10A, at a data cable antenna attachment point 115.

According to the present invention, the robot communication box 10A is readily interposed along the data antenna cable 110, between the data antenna 105 and the data cable antenna attachment point 115. The connection of the robot communication box 10A to the robot 100 is external and does not require any other modification to the robot 100, other than possibly having to reprogram some radio settings in the robot data radio (Data Radio 1), depending on the type of radio the robot uses. As a result, the robot communication box 10A could be readily and conveniently added in the field by non-technical personnel. Also present in the robot communications box is an additional antenna 155 to assist in communications between the OCU and the robot communications box, as may be needed.

FIG. 2 illustrates an OCU 200 that includes a control panel 201, to which the OCU communication box 10B is secured. The control panel 201 is a simplified representation of the electronic, electrical, optical, and mechanical components of an existing OCU 200. The OCU 200 further includes a data antenna 205, which is disposed in communication with the control panel 201 by means of a data antenna cable 210 and the OCU communication box 10B, at a data cable antenna attachment point 215.

According to one embodiment of the present invention, the OCU communication box 10B is readily interposed along the data antenna cable 210, between the data antenna 205 and the data cable antenna attachment point 215. The connection of the OCU communication box 10B to the processing unit 200 is external and does not require any modification to the processing unit 201, other than possibly having to reprogram some radio settings in the OCU data radio (Data Radio 6), depending on the type of radio the robot uses. As a result, the OCU communication box 10B could be readily and conveniently added in the field by non-technical personnel.

In one exemplary, preferred embodiment of the present invention, the communication system 10 is operable to transmit data from sensors 310 (FIG. 3) mounted on the robot 100, back to the OCU 200, via the robot (100) existing data signals. As used herein, "existing data signals" mean the original data signals that existed or would have existed before the incorporation of the present communication system 10. At the OCU 200, the sensor data that is sent via the communication system 10 is extracted from the received data stream, by means of a software application or program product 600 (FIG. 6), in such a manner as to enable the display of such sensor data to the user, as desired.

In another exemplary, preferred embodiment of the present invention, the communication system 10 is operable to transmit commands from an extraneous command interface 410 (FIG. 4) that is external to the OCU 200, to a payload 315 (FIG. 3) disposed on the robot 100. At the robot 100, the extraneous commands that are sent via the communication system 10 are extracted from the data stream by means of a software application or program product 500 (FIG. 5), and sent to the payload 315 for the implementation of the command.

In yet another exemplary, preferred embodiment of the present invention, the communication system 10 is operable to receive data from the sensors 310 that are disposed on the robot 100, and, using the software application 900, issues commands to the robot 100 to enable it to function in an autonomous manner.

Figure 4:
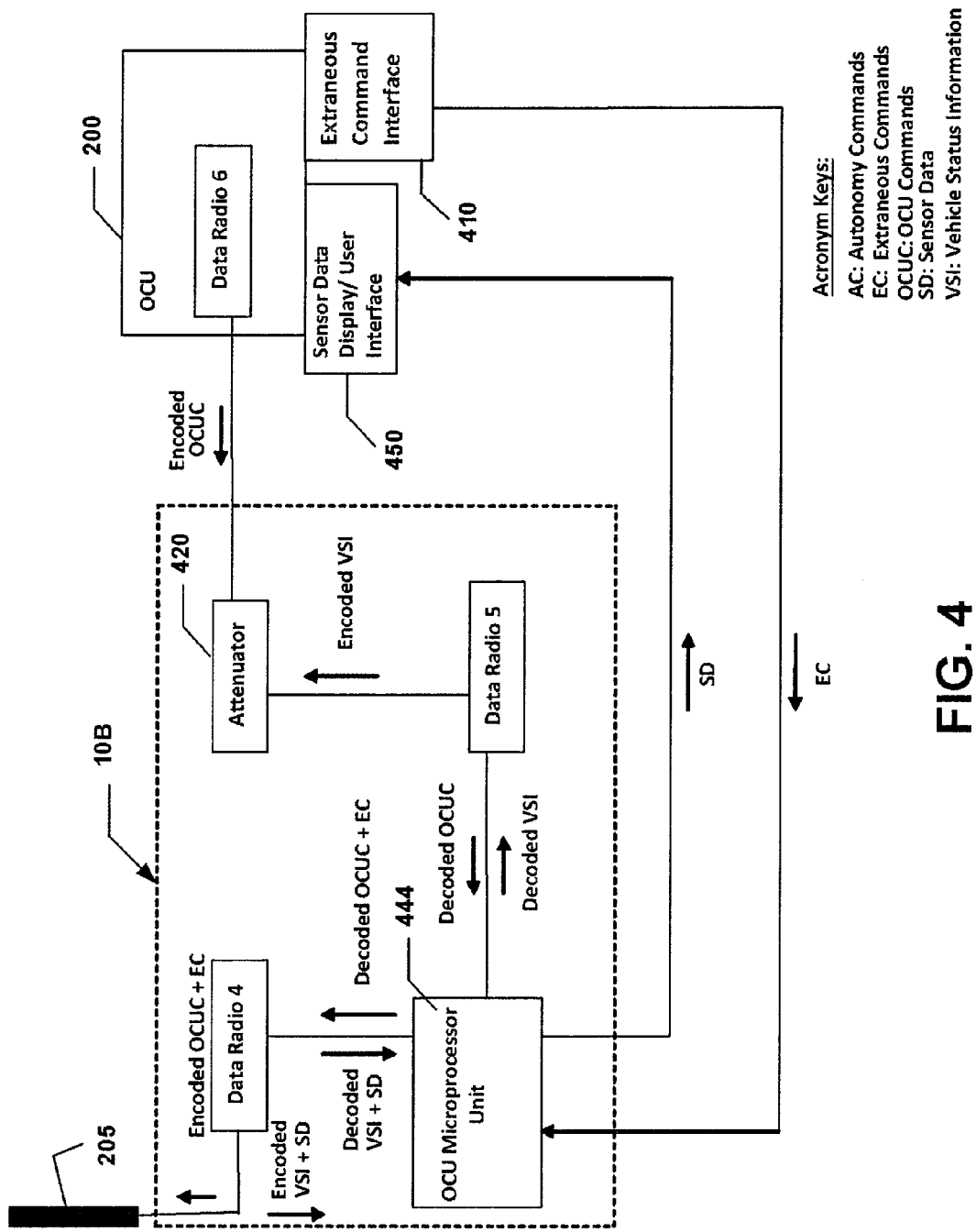
FIG. 4 is a block diagram detailing the main components of the OCU communication box of FIG. 2, and including an OCU microprocessor unit.

FIGS. 3 and 4 further illustrate the connectivity between the communication system 10, the robot 100, and the OCU 200. Specifically, FIG. 3 illustrates the connectivity of the robot 100 with the robot communication box 10A of the communication system 10. The exemplary robot 100 includes a data radio 1, which normally sends vehicle status information (VSI) from the robot 100 to the OCU 200. Data radio 1 normally encodes and/or modulates this data in preparation for sending it as a radio signal or data stream. This encoded VSI is sent to data radio 2, within the robot communication box 10A via a bidirectional attenuator 320. The bidirectional attenuator 320 attenuates the signals transmitted between data radio 1 and data radio 2 in a similar way as this signal would have been attenuated by propagation through free space to the robot 100. The bidirectional attenuator 320 prevents a strong signal (i.e., above a predetermined threshold) from entering data radio 2. Data radio 2 decodes the VSI and sends the decoded VSI to a robot microprocessor unit 333 within the robot communication box, 10A.

In the exemplary embodiment of the robot 100 of FIG. 3, the robot 100 is provided with one or more sensors 310 such as those used to detect information about the robots' environment. The sensors 310 may be added to the robot 100, by attaching them externally to the robot chassis 101, in communication with the robot communication box 10A. Data from the sensors 310 is communicated to the robot microprocessor unit 333.

Figure 5:
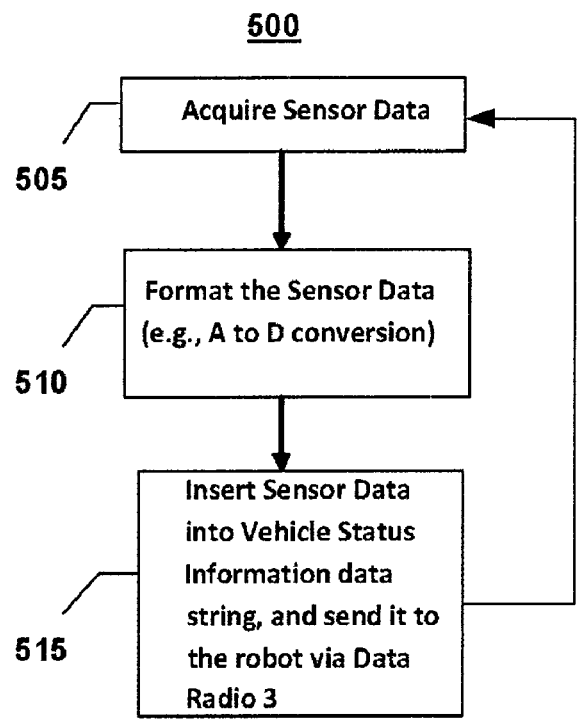
FIG. 5 is a high level flow chart illustrating a software application that is embedded in, and executed by the robot microprocessor unit of FIG. 3, for sending data from a sensor mounted on the robot to the OCU.

In turn, the robot microprocessor unit 333 integrates the sensor data (SD) into the proper location in the VSI data stream, via the software program product 500 (FIG. 5). The decoded VSI with the sensor data is then sent to data radio 3 within the robot communication box 10A for encoding and transmission via the robot data antenna 105 to the OCU communication box 10B.

FIG. 4 illustrates the connectivity of the OCU 200 with the OCU communication box 10B. The encoded VSI with the sensor data is received by the OCU data antenna 205. Data radio 4 within the OCU 200, decodes the VSI and the sensor data. An OCU microprocessor unit 444 that forms part of the OCU communication box 10B separates (i.e., demultiplexes) the sensor data from the VSI data stream (i.e., the existing data stream sent from the original manufacturer's equipment) and sends it to a user interface 450 that is disposed on, or in communication with the OCU 200. As an example, the user interface 450 displays, or otherwise makes available to the user, the sensor data.

The decoded VSI is concurrently sent to a data radio 5 within the OCU communication box 10B for encoding and transmission to the OCU 200. A bidirectional attenuator 420 is disposed in communication between a data radio 5 within the OCU communication box 10B and a data radio 6 within the OCU 200, to prevent a strong signal from entering the data radio 6. Data radio 6, which is the data radio inside the OCU 200, receives the VSI, unchanged, as it normally would have received the VSI without the communication system 10.

Another feature of the present invention is the ability to transmit extraneous commands to the robot 100 from the OCU 200. Such transmission is performed in the following sequence:

Data radio 6, which is the data radio within the OCU 200, normally sends OCU commands (OCUC) from the OCU 200 to the robot 100. Data radio 6 normally encodes and/or modulates this data in preparation for sending it as a radio signal.

This encoded OCUC is sent to data radio 5 via the bidirectional attenuator 420, which prevents a strong signal from entering data radio 5.

Data radio 5 decodes the OCUC and sends them to the OCU microprocessor unit 444.

The OCU microprocessor unit 444 passes the decoded OCUC, along with the extraneous commands (EC) to the data radio 4 of the OCU communication box 10B for encoding and transmission to the robot 100.

The encoded OCUC and EC are received by the robot data antenna 105 and data radio 3 of the robot communication box 10A (FIG. 3).

Data radio 3 decodes the OCUC and EC, and passes them to the robot microprocessor unit 333.

The robot microprocessor unit 333 extracts the EC from the command string en route to the robot 100, and sends them to the payload or payloads 315 on the robot 100.

Within the robot microprocessor unit 333, autonomy commands for the robot 100 can be integrated into the data stream of OCUC. In particular, an autonomy module 344 within the robot microprocessor unit 333, is used with the robot 100 to perform at least some or all of the following exemplary types of functions:

(1) Obtain data from sensors 310 on the robot 100 to gather information about the robot's surroundings.
(2) Obtain information about the status of various parts of the robot 100 from the VSI that the robot sent to the OCU 200.
(3) Calculate trajectories for various parts or components of the robot 100 to get them to move in certain ways.
(4) Transmit commands to the various parts or components of the robot 100 to make them carry out these actions.

The sensors 310 that are used by the autonomy module 344 of the robot communication box 10A could be mounted on the robot 100 for transmitting their data to the robot microprocessor unit 333. Decoded VSI are also sent to the robot microprocessor unit 333, as described earlier. The robot microprocessor unit 333 then selectively extracts data of the VSI that are of interest for the autonomy calculations, such as the robot's GPS coordinates or a robot arm encoder data, and sends the extracted data of the VSI to an autonomy calculator 344 within the robot microprocessor unit 333.

In turn, the autonomy calculator 344 combines the sensor data and the VSI, and calculates trajectories for various robot parts or components. It also determines which commands to send to the robot 100 to make it implement these trajectories. The autonomy calculator 344 then integrates these commands into the data stream of OCUC coming from the OCU.

The OCUC with any autonomy commands (AC), are sent to data radio 2 of the robot communication box 10A for encoding. The encoded data stream is then sent, via a bidirectional attenuator 320, to data radio 1 within the robot 100. Data radio 1 receives the OCUC and autonomy commands, and sends them to an internal microprocessing unit within the robot, for routing to the various parts of the robot 100.

Figure 7:
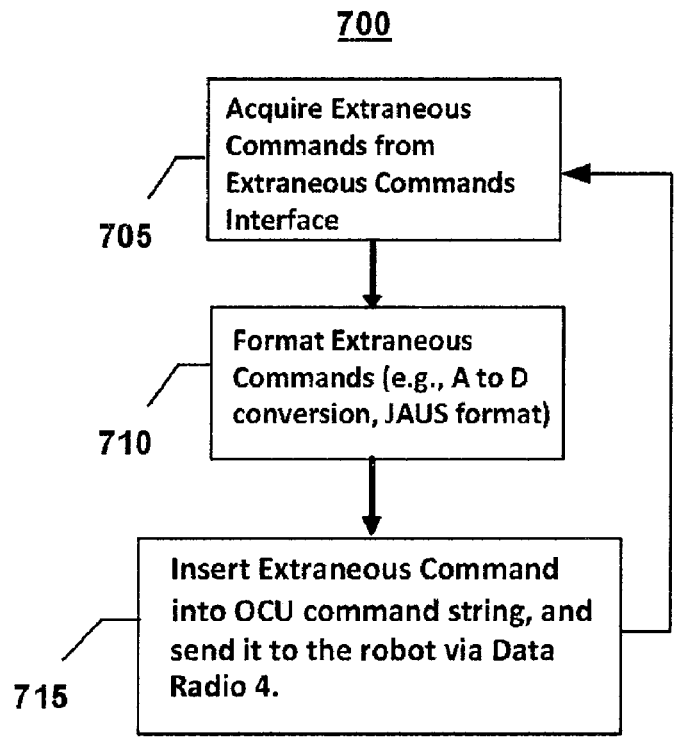
FIG. 7 is a high level flow chart illustrating a software application that is embedded in, and executed by the OCU microprocessor unit of FIG. 4, for controlling payloads mounted on the robot.
Figure 8:
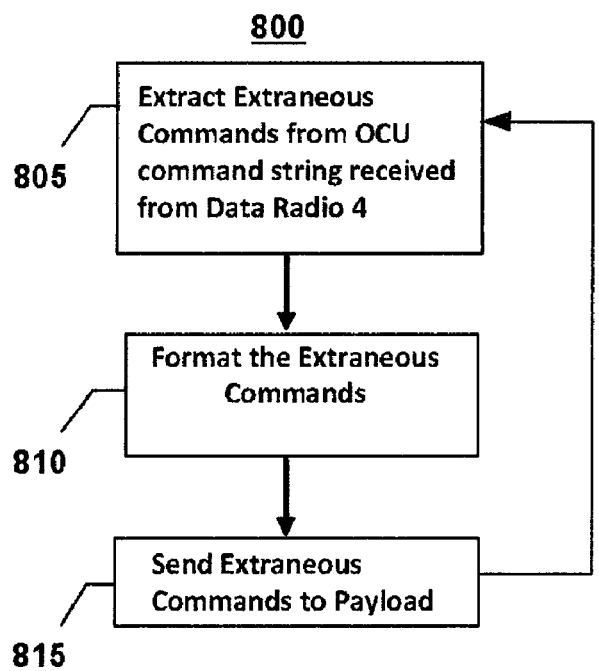
FIG. 8 is a high level flow chart illustrating a software application that is embedded in, and executed by the robot microprocessor unit of FIG. 3, for controlling payloads mounted on the robot.

As indicated earlier, the communication system 10 comprises two software program products 700 and 800 that enable the communication system 10 to insert command transmit data within an existing data stream without disrupting the existing data stream, remove the data from the existing data stream, and decode the data so as to determine and institute the command data. The high-level flow diagrams illustrated in FIGS. 7-8 illustrate the functional steps taken by the software program products 700 and 800, for enabling the implementation of the afore-mentioned features.

The initiation of the autonomous processes is implemented similarly to the extraneous commands explained earlier, i.e. via the extraneous command Interface 410 that is disposed on, or in communication with the OCU 200 (FIG. 4).

Controlling the execution of the autonomous process is done by the autonomy calculator 344 (FIG. 4), which is a software program contained or integrated in the robot microprocessor unit 333, within the robot communication box 10A that is mounted on the robot 100. The software process 900 that the autonomy calculator 344 performs is outlined in FIG. 9.

The data insertion into, and extraction from an existing data stream, by the present invention will now be described in more detail with respect to FIGS. 5 through 9.

FIGS. 5 through 9 illustrate the process by which the communication system 10 of the present invention inserts data into a robot's existing data stream, and extracts data from the robot's existing data stream, without disrupting the robot's data communication stream. According to an exemplary preferred embodiment, the communication system 10 interfaces with the robot 100 that sends multi-data-field command strings several times per second, such that each field contains a command to a different part or component of the robot 100.

Figure 6:
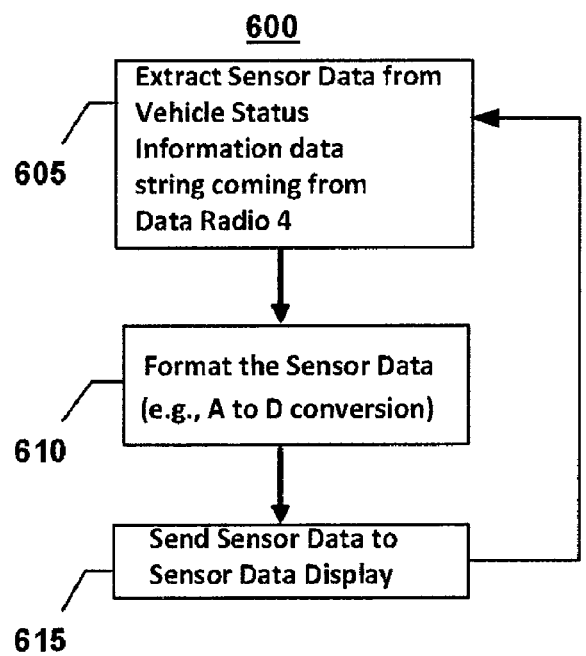
FIG. 6 is a high level flow chart illustrating a software application that is embedded in, and executed by the OCU microprocessor unit of FIG. 4, for receiving data from a sensor mounted on the robot and making it available for display at the OCU.

FIG. 5 is a high level flow chart illustrating a process 500 that is executed by the robot microprocessor unit 333 of FIG. 3, for sending data from one more sensors 310 mounted on the robot 100 to the OCU 200. FIG. 6 is a high level flow chart illustrating a process 600 that is executed by OCU microprocessor unit 444 of FIG. 4, for receiving the data sent from one more sensors 310, using the process 500, to the OCU 200.

Figure 9:
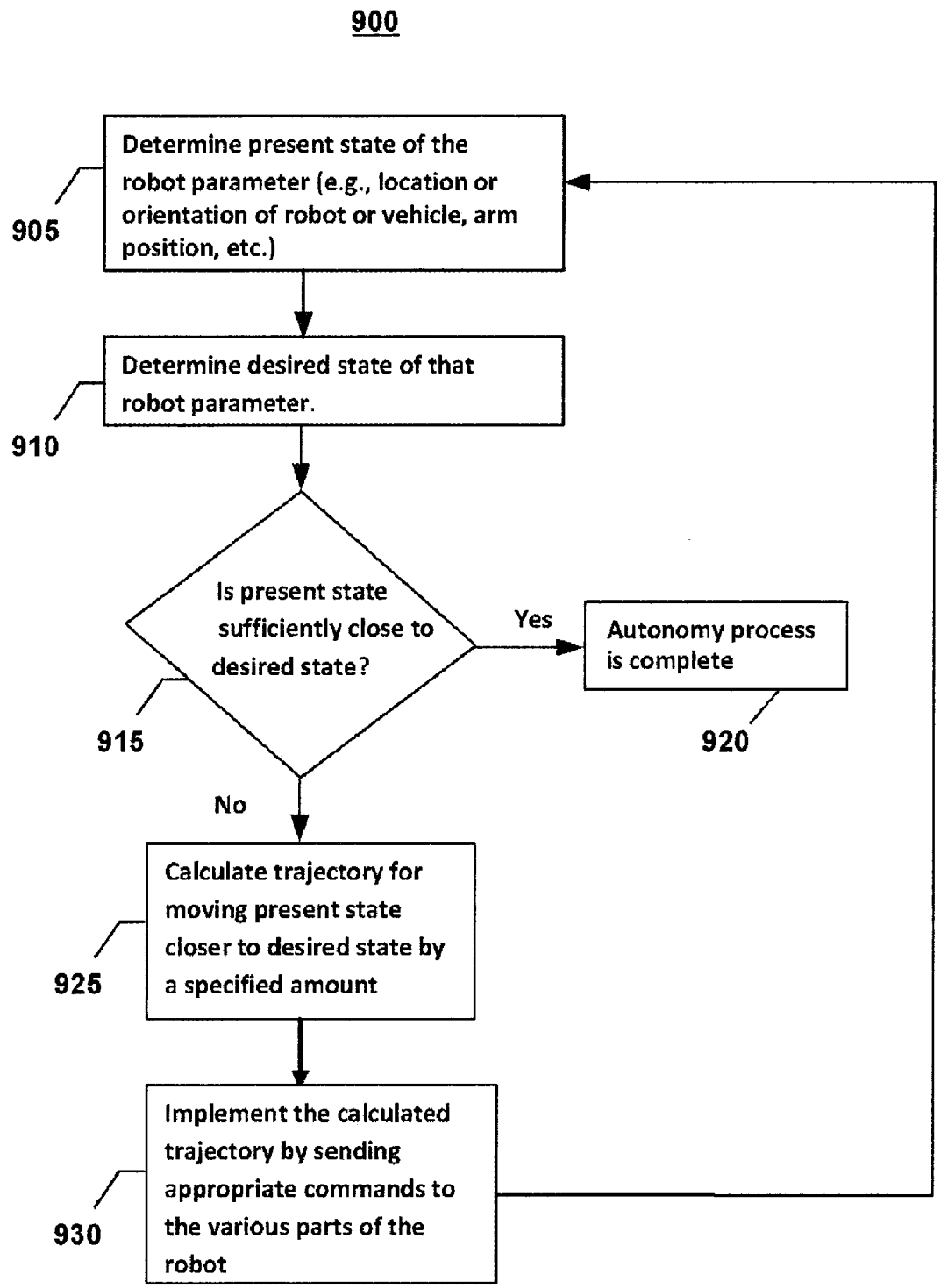
FIG. 9 is a flow chart illustrating a software application that is embedded in, and executed by an autonomy calculator of the robot microprocessor unit of FIG. 3.

FIG. 7 is a high level flow chart illustrating a process 700 that is executed by the OCU microprocessor unit 444 of FIG. 4, for controlling payloads 315 mounted on the robot 100. FIG. 8 is a high level flow chart illustrating a process 800 that is executed by the robot microprocessor unit 333 of FIG. 3, for controlling payloads 315 mounted on the robot 100. FIG. 9 is a flow chart illustrating a process 900 that is executed by the autonomy calculator 344 of the robot microprocessor unit 333.

FIGS. 5-9 will now be described in more detail. With reference to the process 500 of FIG. 5, the robot microprocessor unit 333 acquires the sensor data at step 505. It then formats the acquired data at step 510, for example by means of an analog to digital conversion. Thereafter, at step 515, the robot microprocessor unit 333 inserts the formatted sensor data into the VSI data string, and sends it to the OCU 200, via data radio 3.

With reference to the process 600 of FIG. 6, the OCU microprocessor unit 444 starts at step 605, by receiving the formatted sensor data that is sent to the OCU 200 at step 515 over data radio 4, and by extracting the sensor data from the VSI. At step 610, the OCU microprocessor unit 444 formats the sensor data that was extracted at step 605, in a predetermined manner that is required by the sensor data display/user interface 450. Thereafter, at step 615, the OCU microprocessor unit 444 sends the formatted sensor data to the sensor data display/user interface 450.

With reference to the process 700 of FIG. 7, the OCU microprocessor unit 444 acquires the extraneous commands from the extraneous command interface 410, at step 705. It then formats the acquired extraneous commands at step 710, for example by means of an analog to digital conversion or JAUS format. Thereafter, at step 715, the OCU microprocessor unit 444 inserts the formatted extraneous commands into an OCU command string, and sends it to the robot 100, via data radio 4.

With reference to the process 800 of FIG. 8, the robot microprocessor unit 333 starts at step 805, by receiving the formatted extraneous commands that is sent from the OCU 200 at step 715, over data radio 3, and by extracting the extraneous commands from the command string. At step 810, the robot microprocessor unit 333 formats the extraneous commands that were extracted at step 805, in a predetermined manner that is required by the payload 315. Thereafter, at step 815, the robot microprocessor unit 333 sends the formatted extraneous commands to the payload 315.

Process 900 is explained with reference to FIG. 9, illustrating the inputted and outputted data from the autonomy calculator 344. At step 905, process 900 determines the present state of the robot parameters, such as the location or orientation of the robot 100, its arm position, etc. The decoded vehicle status information (VSI) received from the data radio 2, and the sensor data received from the sensors 310 on robot 100, are sent to the autonomy calculator 344.

At step 910, process 900 determines the desired state of the robot parameters. The sensor data from the sensors 310 on the robot 100 is sent to the autonomy calculator 344.

At decision step 915, process 900 determines if the present state of stop 905 is sufficiently close to the desired state of step 910. If it is, then process 900 completes the autonomy process at step 920.

Otherwise, if the present state of step 905 is not sufficiently close to the desired state of step 910, then process 900 proceeds to step 925 where it calculates the trajectory for moving the present state closer to the desired state by a specified amount. The preprogrammed software in the autonomy calculator 344 calculates the trajectory using the VSI and sensor data obtained in steps 905 and 910.

At step 930, process 900 implements the trajectory calculated at step 925, by sending the appropriate commands to the various parts or components of the robot 100. The autonomy commands calculated by the autonomy calculator 344 are sent to the robot 100 via data radio 2.

An exemplary insertion of data into the OCU-to-robot data stream is the implementation of an autonomous process, such as autonomous arm motion. In this example, the autonomy calculator 344 issues commands to the robot's lower and upper arm (e.g., 155) in order to implement the calculated arm trajectory. The issuance of the commands, which is executed as described in step 930 of FIG. 9, proceeds as follows:

(1) The lower arm and the upper arm commands are encoded according to an applicable standard, such as the Joint Architecture for Unmanned Systems (JAUS) standard.

(2) The next data string that contains OCU commands that is sent to the robot 100 is captured.

(3) The value of the parameters in the lower and upper arm control data fields in that string are set to the desired values.

(4) The modified data string, which includes the autonomous arm commands, is then sent to the data radio 2 (FIG. 3) for transmission to the robot 100.

(5) The autonomous commands are inserted into each command string sent to the robot 100, as long as the autonomous arm motions need to be commanded.

Other autonomous commands generated by the autonomy calculator 344, such as driving commands or pan-tilt camera motions, can be integrated into the data stream in the same manner. Further, extraneous commands sent from an interface 410 connected to the OCU 200 may be integrated into the OCU-to-robot data string in the same manner.

An example of insertion of data into the robot-to-OCU data stream is sending data from the sensors 310 mounted on the robot 100 back to the OCU 200. In this case, the robot microprocessor unit 333 receives the sensor data and conditions it as necessary. It then formats the data according to an applicable standard, such as the Department of Defense Common Chemical, Biological, Radiological, and Nuclear Sensor Interface (CCSI) Standard.

Thereafter, the next data string that contains data sent from the robot 100 to the OCU 200 is captured. The formatted data string is appended to the end of that robot-to-OCU data string. The modified data string, which includes the sensor data, is then sent to the data radio 3 for transmission to the OCU 200. This process is repeated for each data string sent from the robot 100 to the OCU 200, as long as the sensor data needs to be sent.

The communication system 10 is quite readily integratable into the robot 100 and the OCU 200. The entire integration effort includes disconnecting the robot antenna 105 and inserting the robot communication box 10A in series with the robot antenna 105, and disconnecting the OCU antenna 205 and inserting the OCU communication box 10B in series with the OCU antenna 205.

The communication system 10 provides numerous new capabilities to existing radio-controlled robots 100, without having to reprogram the robot's internal microprocessors. For example, if one desires to add capabilities to a commercial robot 100 whose microprocessors and their computer code is inaccessible, the communication system 10 enables new capabilities to be added to the robot 100 without interfering with the regular operation of the robot 100.

The following are some exemplary types of new capabilities to be added to the robot that could be added by the communication system 10:

1. Sending data from the following sensors 310 mounted on the robot 100 back to the OCU 200:
    a. Haptic sensors in gripper.
    b. Explosives detector.
    c. Metal detector.
    d. Radiation detector.
    e. Biological and/or chemical sensor.
2. Controlling payloads 315 mounted on the robot 100, as follows:
    a. Control of camera settings.
    b. Control of settings of detectors.
    c. Control of disruptors.
3. Initiating and controlling autonomous processes, as follows:
    a. Autonomous reaching and grasping of objects mounted on the robot or objects in the proximity of the robot.
    b. Autonomous driving, including navigation and obstacle avoidance.

In addition, the communication system 10 enables integration of other additional sensors 310 onto and in communication with the robot 100.

Figure 10:
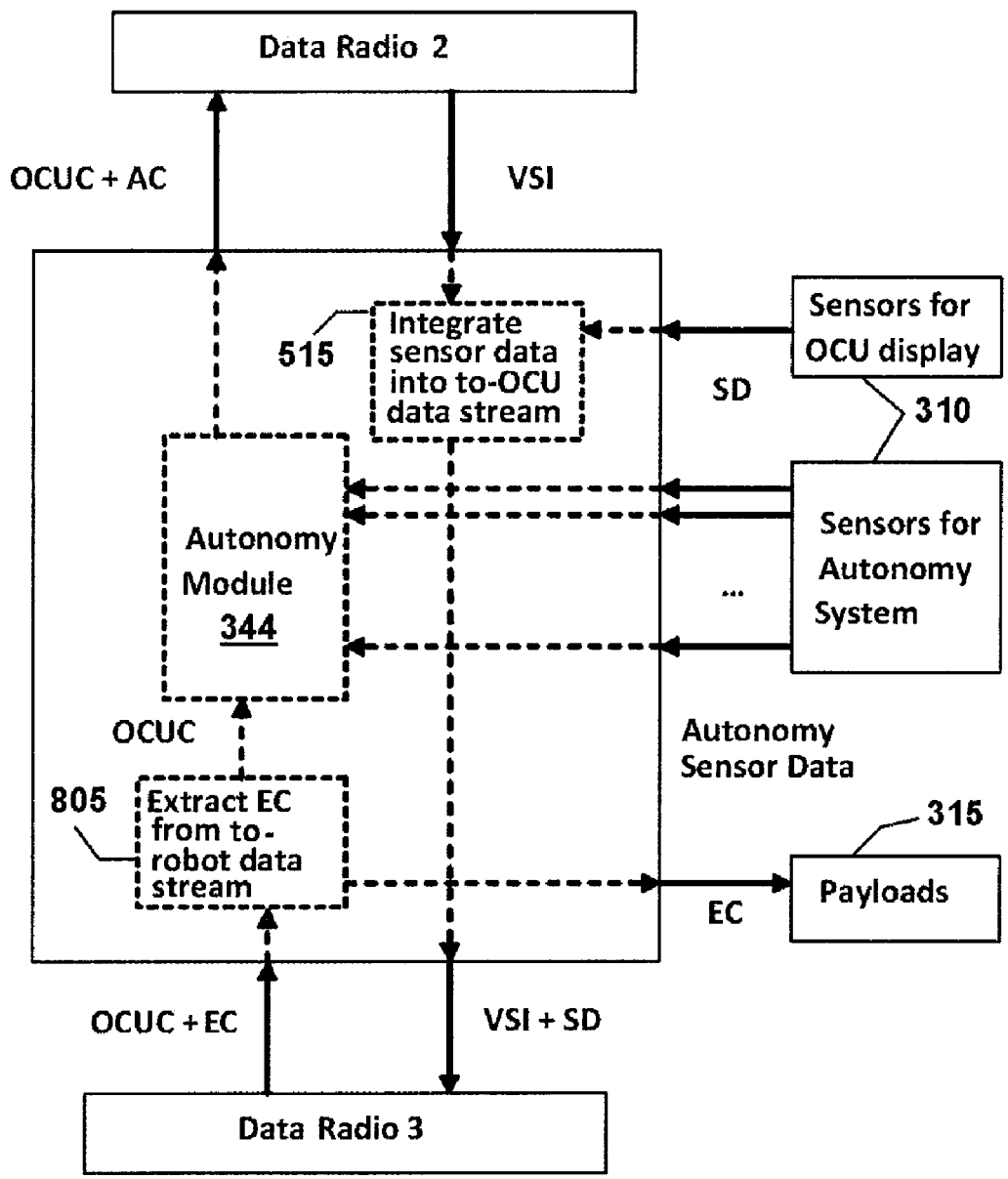
FIG. 10 is a flow chart illustrating inputs, outputs, and software functions of the robot microprocessor in the present communication system.
Figure 11:
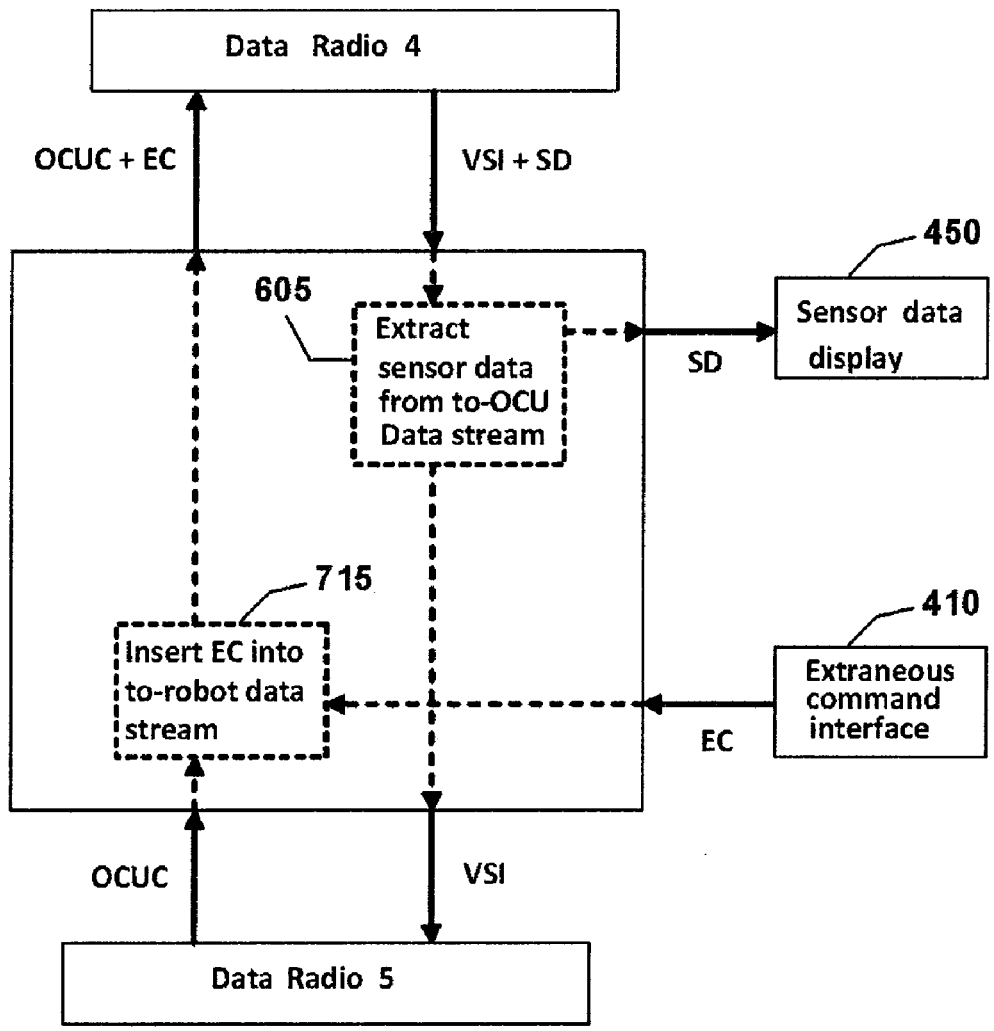
FIG. 11 is a flow chart illustrating inputs, outputs, and software functions of the OCU microprocessor in the present communication system.

FIGS. 10 and 11 illustrate schematically how the software processes depicted in FIGS. 5 through 9 would interface with the existing data communication of the robot 100, with the sensors 310, and the payloads 315 appended to the robot 100 and/or the OCU 200 by the developer.

It is to be understood that the specific embodiments of the invention that have been described are merely illustrative of certain applications of the principle of the present invention. Numerous modifications may be made to the communication system 10 described herein without departing from the spirit and scope of the present invention.

What is claimed is:

1. Adaptive means for providing autonomous capabilities to an interactive robot system, said interactive robot system comprising a remote operator control unit (OCU) comprising a two way radio, (6), an OCU antenna, an OCU sensor data display/user interface, and an OCU extraneous command interface and whereby OCU commands can be entered through said OCU sensor data display/user interface to generate standardized OCU command signals which are broadcast by the two way radio (6) over the OCU antenna in a standardized OCU data stream; and said interactive robot system further comprising a robot device with a robot antenna, another two way radio, (1), and said robot device including means for generating a standardized robot data stream which is broadcast through the two way radio (1) of the robot device and the robot antenna towards the OCU antenna, said standardized robot data stream being representative of conditions within the robot device, and robot device including means for responding to said standardized OCU data stream received over said robot antenna and the two way radio (1) of the robot device to control said robot device to operate in accordance with said OCU commands, said adaptive means comprising:

an add-on robot communication box that is externally connected to the robot device without modification to internal components of the robot device wherein said add-on robot communication box includes an additional a two way radio, (2) and a yet further two way radio, (3), a robot microprocessor unit, a robot bidirectional attenuator; and a first computer program product that runs on said robot microprocessor unit to integrate enhanced robot data into the standardized robot data stream; and an add-on OCU communication box that is externally connected to the operator control unit (OCU) without modification to internal components of the operator control unit (OCU), wherein the add-on OCU communication box comprises a still further two way radio, (4) and a yet additional two way radio, (5), an operator control unit (OCU) microprocessor unit; an OCU bidirectional attenuator device, and a second computer program product that runs on the operator control unit (OCU) microprocessor unit, to integrate enhanced OCU data into said standardized OCU data stream.

2. The system as in claim 1 further comprising at least one or more robot sensors that are mounted on the robot device for providing robot sensor data to the robot device, and whereby selective such robot sensor data may be conveyed for transmission to the operator control unit (OCU) by being multiplexed within said standardized robot data stream.

3. The system as in claim 2 wherein the operator control unit (OCU) receives the multiplexed said standardized robot data stream and the second computer program product of the operator control unit (OCU) extracts the robot sensor data from the multiplexed said standardized robot data stream.

4. The system as in claim 2 wherein said robot sensors include any one or more of: a haptic sensor in gripper, an explosives detector, a metal detector, a radiation detector, a biological sensor, and a chemical sensor.

5. The system as in claim 1 further comprising at least one or more robot payloads that are mounted on the robot device for receiving robot payload commands transmitted to the robot device from the operator control unit (OCU), said— robot payload commands multiplexed with the standardized OCU data stream in the operator control unit (OCU).

6. The system as in claim 5 wherein the robot device receives the multiplexed standardized OCU data stream, and the first computer program product of the robot device extracts such robot payload commands from the multiplexed standardized OCU data stream, for use in controlling robot payloads.

7. The system as in claim 6 wherein controlling the robot payloads include any one or more of: control of camera settings; control of detectors settings; and control of disruptors.

8. The system as in claim 1 further comprising an extraneous command interface that is mounted on the operator control unit (OCU) for transmitting extraneous commands to the robot device multiplexed with the standardized OCU data stream.

9. The system as in claim 8 wherein the robot communication box receives said multiplexed standardized OCU data stream; and the first computer program product of the robot device extracts extraneous commands from the multiplexed standardized OCU data stream, for use in execution of extraneous commands by the robot device.

10. The system as in claim 9 wherein controlling the extraneous commands by the robot device include any one or more of: autonomous reaching and grasping of objects mounted on and in proximity of the robot device; and autonomous driving, including navigation and obstacle avoidance.

* * * * *